(12) United States Patent
Obermann et al.

(10) Patent No.: US 11,305,412 B2
(45) Date of Patent: Apr. 19, 2022

(54) SENSORLESS MOTOR CONTROL FOR A POWER TOOL

(71) Applicant: MILWAUKEE ELECTRIC TOOL CORPORATION, Brookfield, WI (US)

(72) Inventors: Timothy R. Obermann, Waukesha, WI (US); Douglas R. Fieldbinder, Greendale, WI (US); Alex Huber, Menomonee Falls, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/054,913

(22) PCT Filed: Apr. 15, 2020

(86) PCT No.: PCT/US2020/028251
§ 371 (c)(1),
(2) Date: Nov. 12, 2020

(87) PCT Pub. No.: WO2020/214659
PCT Pub. Date: Oct. 22, 2020

(65) Prior Publication Data
US 2021/0229255 A1      Jul. 29, 2021

Related U.S. Application Data

(60) Provisional application No. 62/833,834, filed on Apr. 15, 2019.

(51) Int. Cl.
*H02P 1/04*          (2006.01)
*B25F 5/00*         (2006.01)
(Continued)

(52) U.S. Cl.
CPC ............... *B25F 5/00* (2013.01); *H02K 11/27* (2016.01); *H02K 21/16* (2013.01); *H02P 6/182* (2013.01); *H02P 21/18* (2016.02); *H02P 2203/03* (2013.01)

(58) Field of Classification Search
CPC .......... B25F 5/00; H02K 11/27; H02K 21/16; H02P 6/085; H02P 6/20; H02P 6/181;
(Continued)

(56) References Cited

U.S. PATENT DOCUMENTS 9,819,290 B2   11/2017   Ma et al.
2006/0001393 A1   1/2006   Rozman
(Continued)

FOREIGN PATENT DOCUMENTS

| CN | 102780430 A | 11/2012 | |
| EP | 3751724 A1 * | 12/2020 | .......... H02P 29/0241 |
| KR | 1020150122701 A | 11/2015 | |
| WO | 2016100879 A1 | 6/2016 | |
| WO | 2019056072 A1 | 3/2019 | |

OTHER PUBLICATIONS

International Search Report and Written Opinion for Application No. PCT/US2020/028251 dated Jul. 31, 2020 (11 pages).

*Primary Examiner* — Karen Masih
(74) *Attorney, Agent, or Firm* — Michael Best & Friedrich LLP

(57) ABSTRACT

Methods and power tools for sensorless motor control. One embodiment provides a method for automatic control switching for driving a sensorless motor (150) of a power tool (100). The method includes determining, using a motor controller (224), a first load point based on user inputs (232) and determining, using the motor controller (224), a first motor control technique corresponding to the first load point. The method also includes driving the motor (150) based on the first motor control technique. The method further includes determining, using the motor controller
(Continued)

(224), a change from the first load point to a second load point and determining, using the motor controller (224), a second motor control technique corresponding to the second load point. The method includes driving the motor (150) based on the second motor control technique.

21 Claims, 13 Drawing Sheets

(51) Int. Cl.
*H02K 11/27* (2016.01)
*H02P 21/18* (2016.01)
*H02K 21/16* (2006.01)
*H02P 6/182* (2016.01)

(58) Field of Classification Search
CPC .......... H02P 21/18; H02P 21/34; H02P 6/182; H02P 2203/03; H02P 21/10
See application file for complete search history.

(56) References Cited

U.S. PATENT DOCUMENTS

| | | |
|---|---|---|
| 2010/0259206 A1 | 10/2010 | Joachimsmeyer |
| 2014/0131059 A1* | 5/2014 | Verbrugge .............. B25F 5/008 173/217 |
| 2017/0099025 A1 | 4/2017 | Ma et al. |

* cited by examiner

SENSORLESS MOTOR CONTROL FOR A POWER TOOL

RELATED APPLICATIONS

This application is a national phase filing under 35 U.S.C. § 371 of International Application No. PCT/US2020/028251, filed Apr. 15, 2020, which claims priority to U.S. Provisional Patent Application No. 62/833,834, filed on Apr. 15, 2019, the entire content of which is incorporated herein by reference.

FIELD

Embodiments described herein relate to sensorless motor control in power tools.

BACKGROUND

The use of brushless direct-current (BLDC) motors in power tools provides efficiency and power output improvements. These motors are powered by an inverter bridge including power switching elements. A controller of the power tool controls the power switching elements, for example, using pulse-width modulated (PWM) drive signals to operate the motor. The duty cycle of the PWM signals can be varied to vary the speed of rotation of the motor.

SUMMARY

Unlike in brushed motors, a position of the rotor may be determined in order to control operation of the BLDC motor. For example, systems with BLDC motors may use sensors (e.g., Hall sensors) or encoders (e.g., rotary encoders) to detect the position of magnets in the rotor and, thereby, control the timing of the drive signals to the power switching elements.

In BLDC motors, the inclusion of rotor position sensors adds cost and increases size of the power tools, as well as increases inefficiencies of driving the motor. Accordingly, for at least these reasons, there is a need for at least one or more of sensorless motors, methods for detecting rotor position in sensorless motors, and techniques for operating the sensorless motors.

Methods described herein provide for automatic control of switching for driving a sensorless motor of a power tool. The methods include determining, using a motor controller, a first load point based on user inputs and determining, using the motor controller, a first motor control technique corresponding to the first load point. The method also includes driving the motor based on the first motor control technique. The method further includes determining, using the motor controller, a change from the first load point to a second load point, and determining, using the motor controller, a second motor control technique corresponding to the second load point. The method includes driving the motor based on the second motor technique.

Power tools described herein provide include a sensorless motor, an inverter bridge configured to provide operating power to the motor, and a motor controller coupled to the inverter bridge. The motor controller is configured to determine a first load point based on user inputs and determine a first motor control technique corresponding to the first load point. The motor controller is also configured to drive, using the inverter bridge, the motor based on the first motor control technique. The motor controller is further configured to determine a change from the first load point to a second load point and determine a second motor control technique corresponding to the second load point. The motor controller is configured to drive, using the inverter bridge, the motor based on the second motor technique.

Methods described herein provide for automatic control of switching for driving a sensorless motor of a power tool. The methods include detecting, using a motor controller, power tool operating parameters, and determining, using the motor controller, a load point of the power tool based on the power tool operating parameters. The methods also include determining, using the motor controller, a motor control technique corresponding to the load point and driving, using the motor controller, the motor based on the motor control technique.

Power tools described herein include a sensorless motor, an inverter bridge configured to provide operating power to the motor, and a motor controller coupled to the inverter bridge. The motor controller is configured to detect power tool operating parameters and determine a load point of the power tool based on the power tool operating parameters. The motor controller is also configured to determine a motor control technique corresponding to the load point and drive, using the inverter bridge, the motor based on the motor control technique.

Methods described herein provide for high-frequency injection rotor position detection in a sensorless motor of a power tool. The methods include coupling, using a coupling circuit, a high-frequency injection signal to the motor and detecting, using the motor controller, a motor response to the high-frequency injection signal. The methods further include determining, using the motor controller, rotor position based on motor response while maintaining lower switch frequency on an inverter bridge and driving, using the motor controller, the motor based on the detected rotor position.

Power tools described herein include a sensorless motor, a coupling circuit, an inverter bridge configured to provide operating power to the motor, and a motor controller coupled to the inverter bridge and the coupling circuit. The coupling circuit is configured to couple a high-frequency injection signal to the motor. The motor controller is configured to detect motor response to the high-frequency injection signal and determine rotor position based on motor response while maintaining lower switch frequency on the inverter bridge. The motor controller is also configured to drive, using the inverter bridge, the motor based on the detected rotor position.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the invention will become apparent by consideration of the detailed description and accompanying drawings.

DETAILED DESCRIPTION

Figure 1:
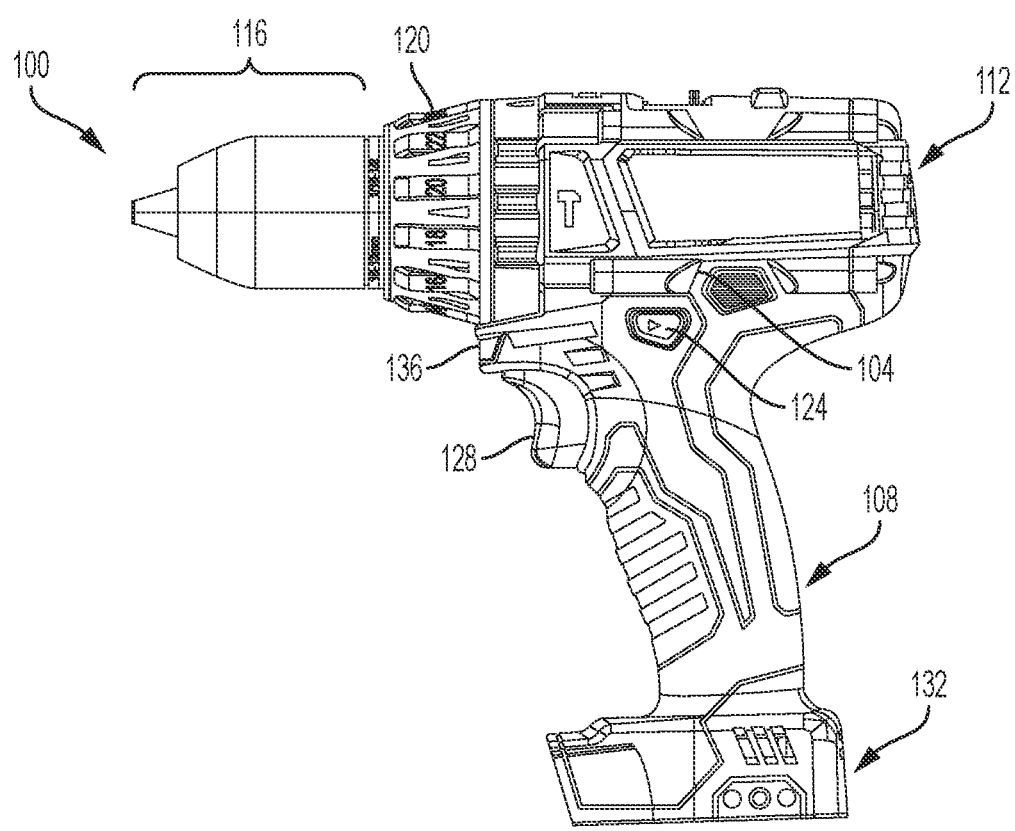
FIG. 1 is a side view of a power tool in accordance with some embodiments.

FIG. 1 illustrates one example embodiment of a power tool 100 incorporating a brushless direct-current (BLDC) motor. The power tool 100 is, for example, a brushless hammer drill having a housing 104 with a handle portion 108 and motor housing portion 112. The power tool 100 further includes an output driver 116 (illustrated as a chuck), a torque setting dial 120, a forward/reverse selector 124, a trigger 128, a battery interface 132, and a light 136. Although FIG. 1 illustrates a hammer drill, in some embodiments, the motors and motor drives described herein are incorporated into other types of power tools including drill-drivers, impact drivers, impact wrenches, angle grinders, circular saws, reciprocating saws, string trimmers, leaf blowers, vacuums, and the like.

Figure 2A:
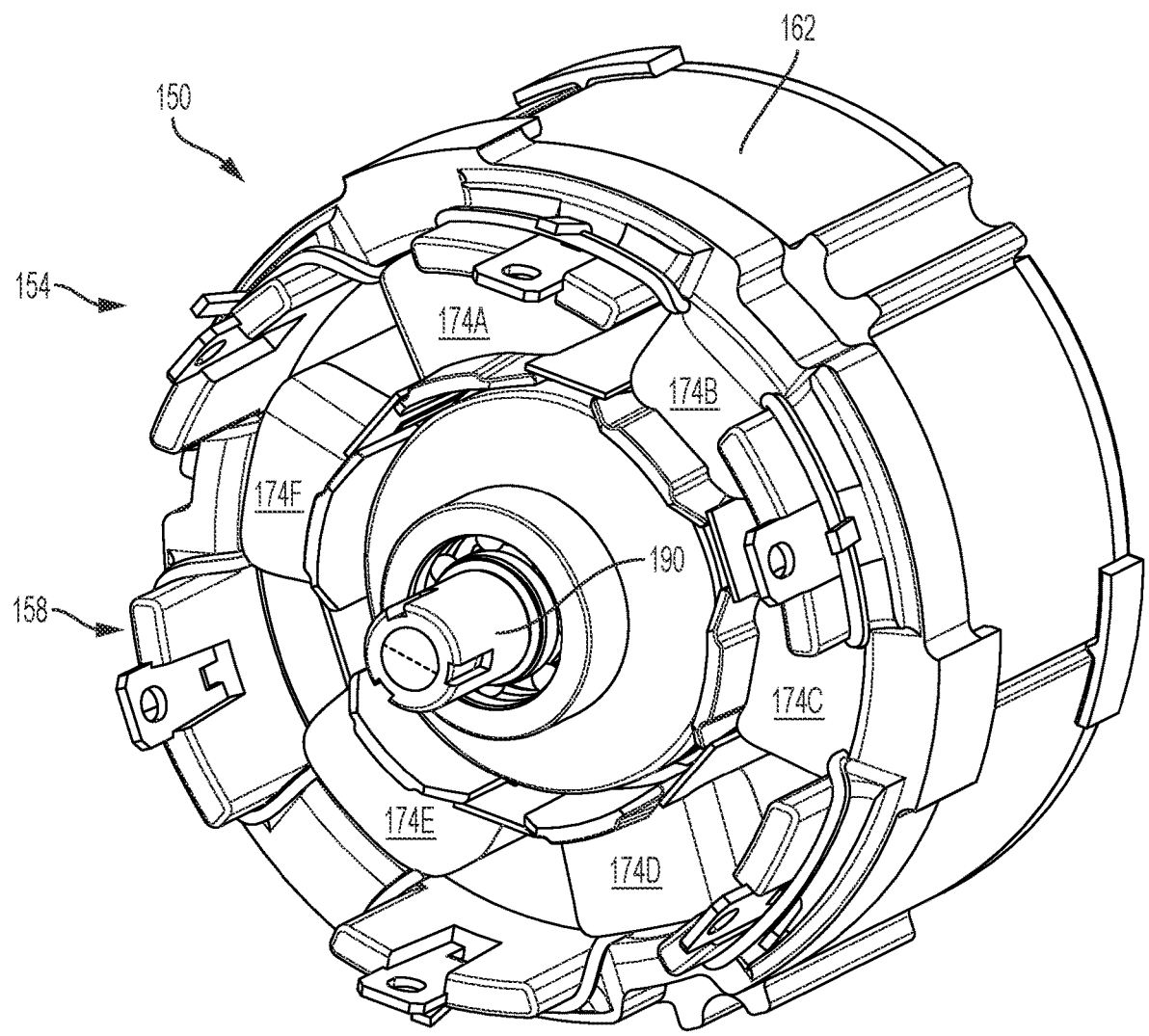
FIG. 2A is a perspective view of a motor of the power tool of FIG. 1 in accordance with some embodiments.
Figure 2B:
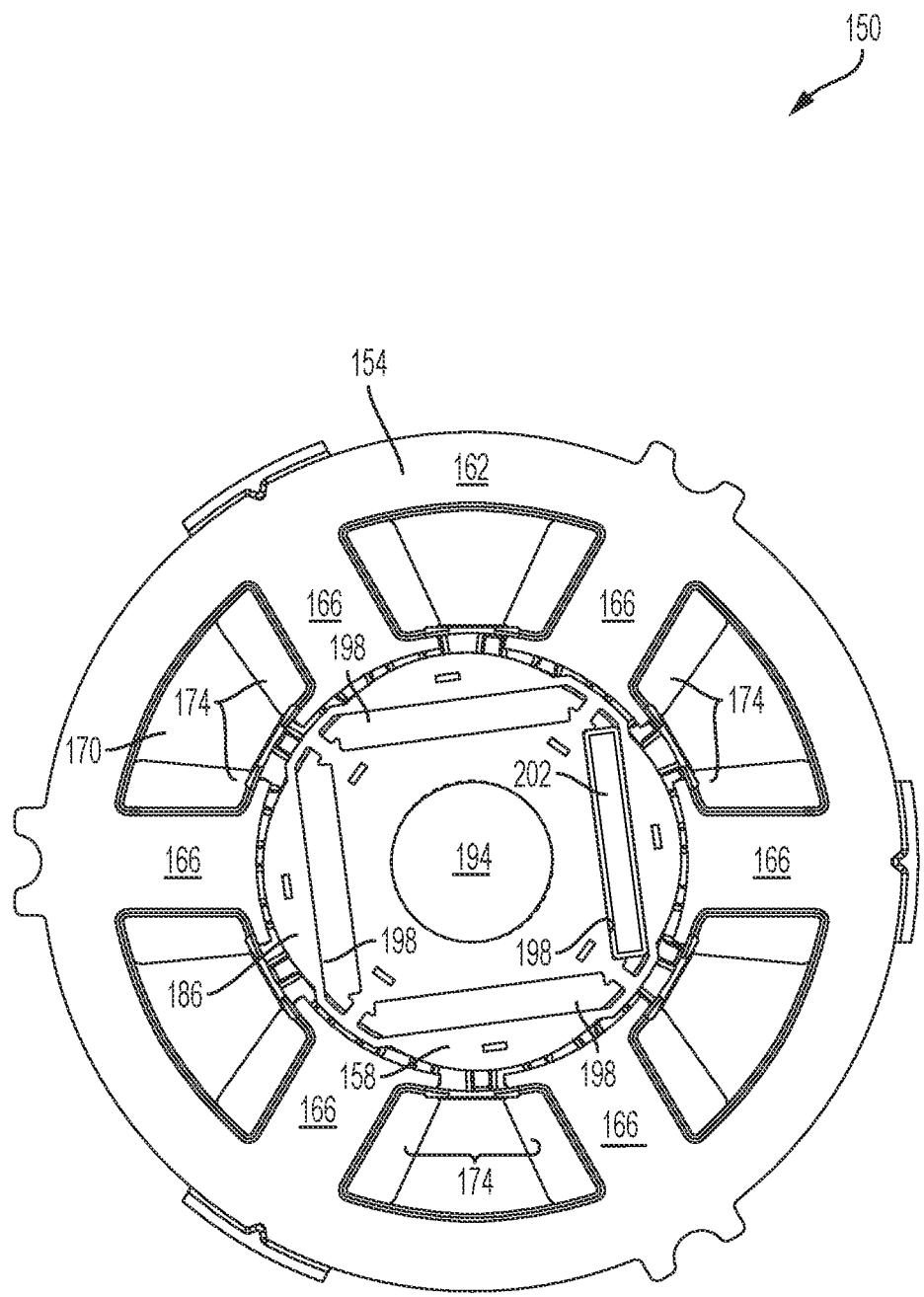
FIG. 2B is a cross-sectional view of a motor of the power tool of FIG. 1 in accordance with some embodiments.

The power tool 100 incorporates a brushless direct current (DC) motor 150 (FIGS. 2A-2B). In a brushless motor power tool, such as power tool 100, switching elements are selectively enabled and disabled by control signals from a controller to selectively apply power from a power source (e.g., battery pack) to drive a brushless motor 150. With reference to FIGS. 2A-2B, the motor 150 includes a stator 154 and a rotor 158 positioned at least partially within the stator 154. The stator 154 includes a plurality of individual laminations stacked together to form a stator core 162 (e.g., a stator stack). The stator 154 includes inwardly extending stator teeth 166 and slots 170 defined between each pair of adjacent stator teeth 166. In the example illustrated, the stator 154 includes six stator teeth 166 defining six stator slots 170. The stator 154 further includes stator windings 174 at least partially positioned within the slots 170. In the example illustrated, the stator windings 174 includes six coils 174A-174F connected in a three phase, parallel delta configuration. In alternative embodiments, the coils 174A-174F may be connected in alternative configurations (e.g., series, delta, etc.).

The rotor 158 includes individual rotor laminations stacked together to form a rotor core 186. A rotor shaft 190 is positioned through a center aperture 194 in the rotor core 186. The rotor 158 includes a plurality of slots 198 in which permanent magnets 202 are received (only one of which is shown in FIG. 2B).

Figure 3:
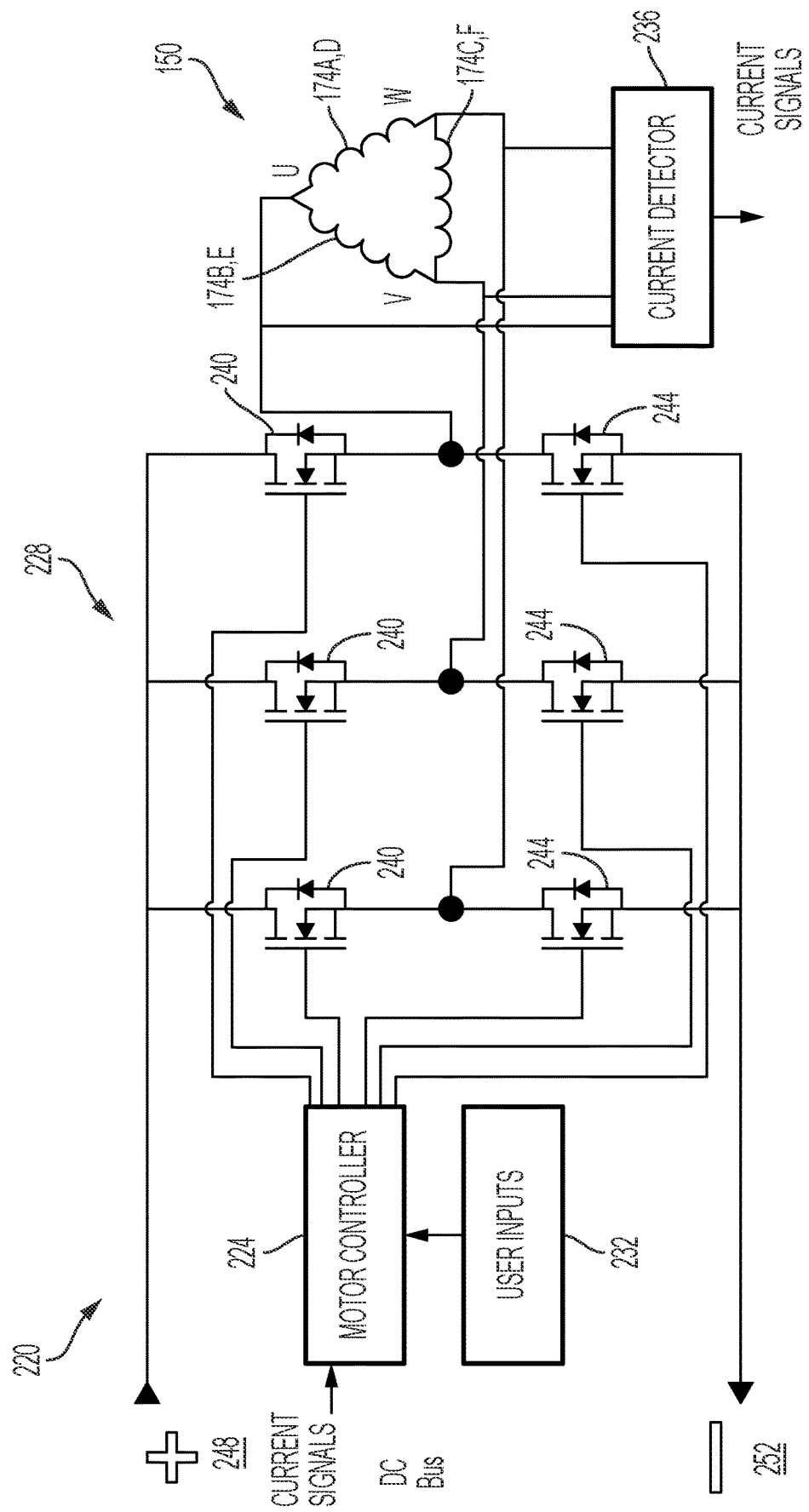
FIG. 3 is a simplified block diagram of a motor drive of the power tool of FIG. 1 in accordance with some embodiments.

FIG. 3 illustrates one example embodiment of a motor drive 220 used to control operation of the motor 150. The motor drive 220 includes a motor controller 224, an inverter bridge 228, and the motor 150. In some embodiments, the motor controller 224 is implemented as a microprocessor with a separate memory. In other embodiments, the motor controller 224 is implemented as a microcontroller (with memory on the same chip). In other embodiments, the motor controller 224 may be implemented partially or entirely as, for example, a field programmable gate array (FPGA), an application specific integrated circuit (ASIC), hardware implemented state machine, etc., and the memory may not be needed or modified accordingly. The motor controller 224 controls the operation of the motor 150 through the inverter bridge 228. The motor controller 224 is communicatively coupled to user inputs 232, and a current sensor 236. The user inputs 232 may include the trigger switch 128, the torque setting dial 120, the forward/reverse selector 124, a mode selector, and the like. The trigger switch 128 may include, for example, a potentiometer, a distance sensor, or the like to determine and provide an indication of the distance the trigger is pulled to the motor controller 224. The current sensor 236 is coupled to the motor coils 174 or the inverter bridge 228 to detect the current flowing through each coil 174. The motor controller 224 performs variable speed control of the motor 150 through the inverter bridge 228 based on one or more of the inputs received from the user input 232 and motor feedback received from the current sensor 236.

The inverter bridge 228 controls the power supply to the three-phase (e.g., U, V, and W) motor 150 of the power tool 100. The inverter bridge 228 includes high-side field effect transistors (FETs) 240 and low-side FETs 244 for each phase of the motor 150. The high-side FETs 240 and the low-side FETs 244 are controlled by corresponding gate drivers implemented in, for example, the motor controller 224.

The drain of the high-side FETs 240 is connected to a positive DC bus 248 (e.g., a power supply), and the source of the high-side FETs 240 is connected to the motor 150 (for example, phase coils 174 of the motor 150) to provide the power supply to the motor 150 (i.e., the corresponding phase coil 174) when the high-side FETs 240 are closed. In other words, the high-side FETs 240 are connected between the positive DC bus 248 and the motor phase coils 174.

The drain of the low-side FETs 244 is connected to the motor 150 (for example, phase coils 174 of the motor 150) and the source of the low-side FETs 244 is connected to negative DC bus 252 (e.g., ground). In other words, the low-side FETs 244 are connected between the motor phase coils 174 and negative DC bus 252. The low-side FETs 244 provide a current path between the motor phase coil 174 and the negative DC bus 252 when closed.

In the example illustrated, to the motor drive 220, the motor 150 appears as coils 174 connected in a DELTA configuration. The below explanation is provided with the DELTA configuration as an example, however, the explanation is equally applicable to other configurations (e.g., a WYE configuration) and the controls for these other configurations are obtained using simple mathematical transforms. The three motor terminals are normally referred to as U, V, and W terminals. The inverter bridge 228 allows the motor drive 220 to connect each terminal to either the positive DC bus 248, the negative DC bus 252, or leave the terminal open as explained above. The motor controller 224 selectively enables the FETs 240, 244 to activate the coils 174 using pulse-width modulated signals provided to the FETs 240, 244. The selective activation of the phase coils 174 produces a force on the permanent magnets 202 of the rotor 158 to rotate the rotor 158. The rotor shaft 190 rotates with the rotor 158 to operate the output driver 116 of the power tool 100.

Conventional motors include Hall sensors (or other rotary encoders) that provide rotor magnet position information to the motor controller 224. The motor controller 224 selectively activates each phase U, V, and W based on the rotor magnet position information. Hall sensors and other external position sensors require additional parts and wiring that add cost, size, and design complexity to the motor drive 220. The presence of sensors also adds cost to the motor 150 and reduces reliability of operation at high temperatures.

During operation of the motor 150, a current passing through a motor phase coil 174 produces a force of the rotor magnets 202 to rotate the rotor 158. Inversely, when a rotor magnet 202 passes by a phase coil 174, the rotor magnet 202 generates a current or back electro-motive force (BEMF) in the phase coil 174. This BEMF can be detected in sensorless motors to determine the rotor position and drive the motor 150 accordingly. Sensorless motors refer to a type of motor that does not include a Hall-effect sensor or other external sensors (e.g., external angular position sensors) to detect a position of the rotor 158. Rather, sensorless motors use the BEMF generated in the inactive phase coils 174 to determine the rotor position. Sensorless motor drives 220 reduce cost and require fewer interconnects between the motor 150 and other components, thereby simplifying the motor design.

Typical motor control includes activating two phases and deactivating one phase of the motor 150. The inactive phase is used to detect the BEMF generated by the rotor 158. For each sequential activation of the phase coils 175, the BEMF generated in the inactive coil is used to detect, for example, a zero-crossing of the BEMF signal. A rotor position can be detected based on the zero-crossings detected in the BEMF signal. The motor controller 224 uses the rotor position as described above to control the rotation of the motor 150.

The motor drive 220 may implement several drive techniques, for example, a six-step control (also referred to as block commutation), sinusoidal control, and field oriented control (FOC). Six-step control includes sequential activation of each phase (or block) to produce a torque in the rotor 158. When a rotor magnet 202 is "0" degrees away from an active phase coil 174, the motor 150 produces no torque in the rotor 158. When the rotor magnet 202 is "90" degrees away from an active phase coil 174, the motor 150 produces a maximum torque in the rotor 158. Six-step control includes the motor controller 224 detecting a position of the rotor 158 to selectively activate the phase that is "90" degrees away to produce the maximum torque in the rotor 158. As described above, the motor controller 224 detects the rotor position based on the BEMF signal detected in the inactive phase coils 174. As the rotor 158 rotates, in response to the motor controller 224 determining the rotor position, the motor controller 224 activates the next phase coil 174 that is "90"

degrees apart from the rotor magnet 202 to continue to produce the optimum amount of torque in the rotor 158 as the rotor 158 rotates.

Figure 4:
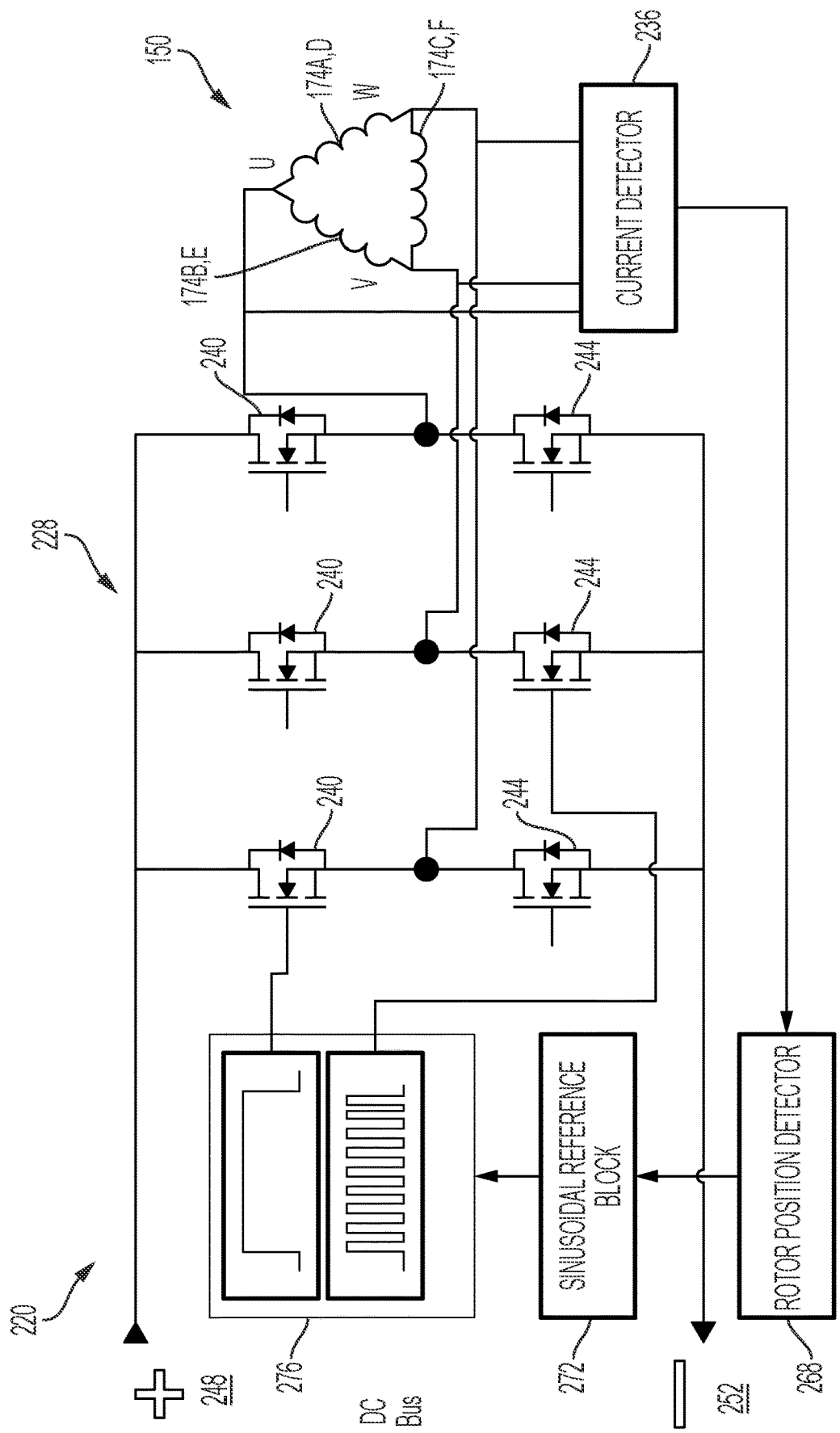
FIG. 4 is a simplified block diagram of the motor drive of FIG. 3 implementing a sinusoidal commutation in accordance with some embodiments.

FIG. 4 illustrates the motor drive 220 for sinusoidal commutation of the motor 150. Unlike six-step control which provides current signals in rectangular blocks of High, Low, or Zero into the coils 174 to drive the motor 150, sinusoidal commutation attempts to provide smooth sinusoidal current signals into the coils 174. The motor drive 220 of FIG. 4 is similar to the motor drive 220 as illustrated in FIG. 3, but with the logical components of the motor controller 224 for sinusoidal commutation broken-down and illustrated. The motor drive 220 includes a rotor position detector 268, a sinusoidal reference block 272, and a PWM generator 276. For example, the motor controller 224 may implement one or more of the rotor position detector 268, the sinusoidal reference block 272, and the PWM generator 276 through execution of instructions stored on a memory of the motor controller 224. The rotor position detector 268 receives the current detection signals from the current detector 236 and provides a rotor position signal to the sinusoidal reference block 272. The sinusoidal reference block 272 receives the user inputs 232 and the rotor position signal and outputs a sinusoidal control signal to the PWM generator 276. The sinusoidal reference block 272 includes, for example, a look-up table having a mapping between user inputs 232 (for example, a desired torque, a desired speed, and the like), rotor position, and sinusoidal control signals. The sinusoidal control signals may provide an indication of the desired signal characteristics (e.g., amplitude, frequency, and the like) of the signals that are to be provided to motor coils 174 to output the desired torque. The PWM generator 276 generates PWM signals and provides the PWM signals to the FETs 240, 244. In the example illustrated, the PWM generator 276 illustrated as providing a first PWM signal to a high-side FET 240 and a second PWM signal to a low-side FET 244. In some embodiments, additional PWM signals may be provided to other FETs 240, 244 to control the current provided to the motor coils 174.

Figure 5:
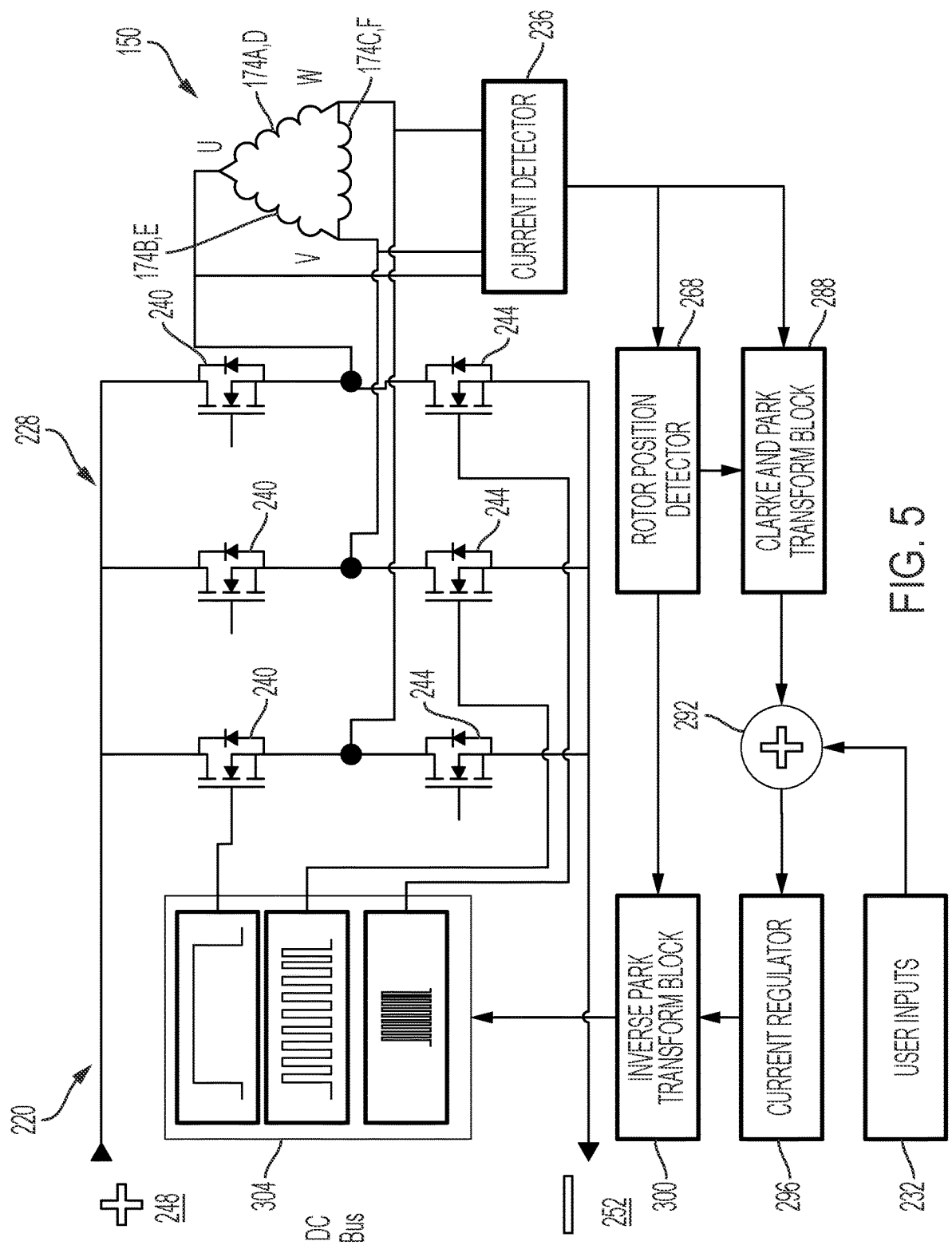
FIG. 5 is a simplified block diagram of the motor drive of FIG. 3 implementing a field oriented control in accordance with some embodiments.

FIG. 5 illustrates the motor drive 220 for field oriented control of the motor 150. Unlike six-step control where coil blocks are commutated sequentially, field orientated control includes providing, for example, a smooth or trapezoidal waveform to the motor coils 174 using PWM control of the FETs 240, 244. The motor drive 220 of FIG. 5 is similar to the motor drive 220 as illustrated in FIG. 3, but with the logical components of the motor controller 224 for field oriented control broken-down and illustrated. The motor drive 220 includes the rotor position detector 268, a Clarke and Park transform block 288, an error comparator 292, a current regulator 296, an inverse Park transform block 300, and a space vector PWM generator 304. For example, the motor controller 224 may implement one or more of the rotor position detector 268, the Clarke and Park transform block 288, the error comparator 292, the current regulator 296, the inverse Park transform block 300, and the space vector PWM generator 304 through execution of instructions stored on a memory of the motor controller 224. The rotor position detector 268 receives the current detection signals from the current detector 236 and provides a rotor position signal to the Clarke and Park transform block 288 and the inverse park transform block 300. The Clarke and Park transform block 288 receives motor phase current signals from at least two of the motor phases U, V, and W and converts using Clarke transform and then Park transform the motor phase current signals to in-phase stator current (id) signal and quadrature phase stator current (iq) signal. The in-phase and quadrature current signals are provided to the error comparator 292. The error comparator 292 also receives the desired in-phase current (idref) signal and desired quadrature current (iqref) signal based on the desired torque from the user inputs 232. The error comparator 292 determines the differences between the detected current signals and the desired current signals and provides the error between the detected current signals and the desired current signals to the current regulator 296. The current regulator 296 outputs voltage control signals (Vq and Vd) in the quadrature and in-phase domains to the inverse Park transform block 300 based on the error signals from the error comparator 292. The inverse Park transform block 300 converts using Park transform the voltage control signals to phase voltage control signals. The phase voltage control signals are provided to the space vector PWM generator 304. In some embodiments, an inverse Clarke transform PWM generator may be used instead of the space vector PWM generator 304. The space vector PWM generator 304 uses space vector modulation for generating PWM signals that are provided to the inverter bridge 228. In the example illustrated, the space vector PWM generator 304 is illustrated as generating three PWM signals provided, respectively, to one high-side FET 240 and two low-side FETs 244 of the inverter bridge 228. In some embodiments, a different number of PWM signals and different selection of FETs 240, 244 may be used to implement field oriented control.

FIGS. 3-5 illustrate only example embodiments of six-step control, sinusoidal commutation, and field oriented control of the motor 150. The control methods described above may be adjusted according to device and motor specifications and designs. Additionally, other motor control techniques not described above may also be used by the motor controller 224 to drive the motor 150.

As discussed above, the motor controller 224 is capable of implementing any of the motor control techniques described above. Each of the motor control techniques includes advantages and disadvantages. Particularly, the motor control techniques produce optimal drive at different load and speed conditions. For example, the six-step control may be used at high speeds and low torque, but may be relatively inefficient at low speed. Six-step control may produce torque ripple at low speeds leading to inefficient operation. Six-step control is, however, better at achieving peak torque from the motor for longer periods of time than sinusoidal or field oriented control techniques. Accordingly, motor efficiency can be improved by using the appropriate motor control technique at the appropriate load point. For example, the motor controller 224 may store a look-up table correlating a plurality of load points to one of the different kinds of motor control techniques. The motor controller 224 may then detect the load point, access the look-up table to determine a motor control technique (selected from a plurality of motor control techniques) that is associated with the load point, and then apply the motor control technique to drive the motor. Accordingly, the motor controller 224 drives the motor using different control techniques at different load points.

Figure 6:
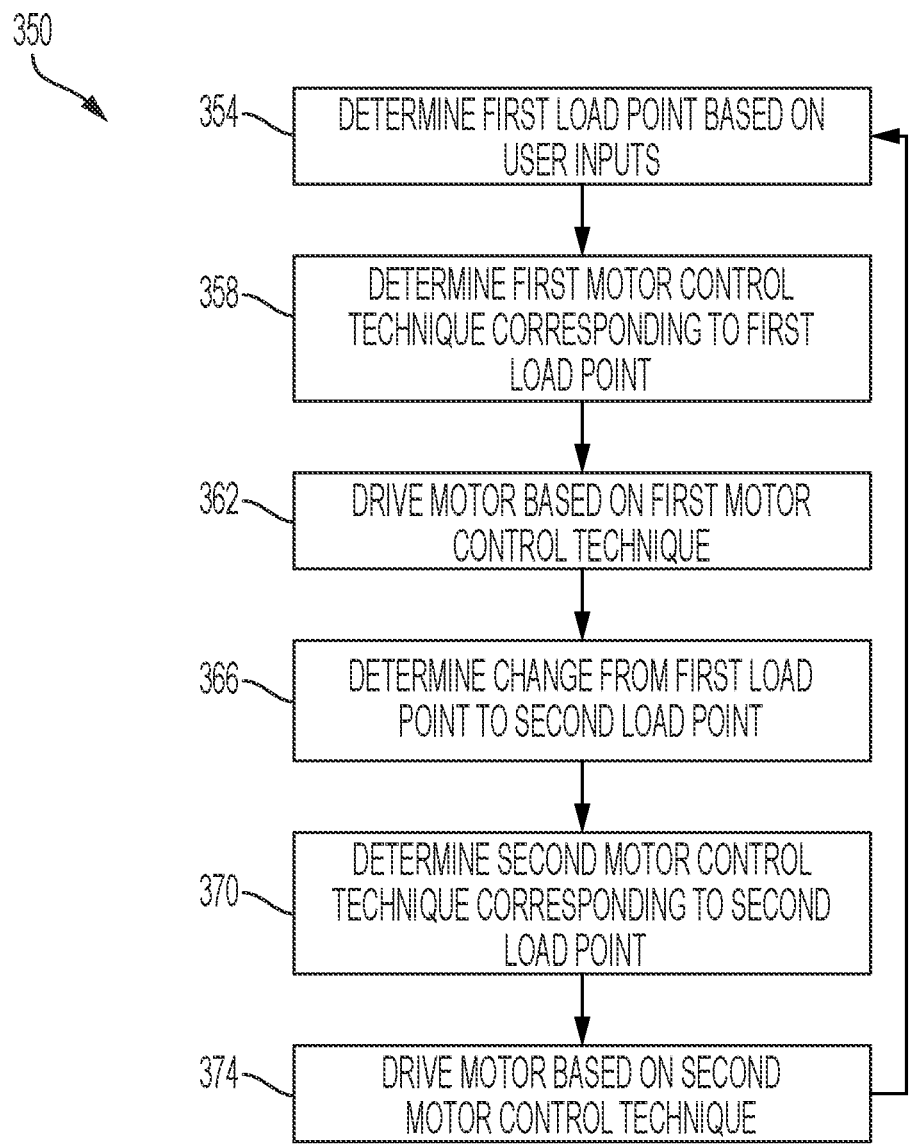
FIG. 6 is a flowchart of a method for automatic control switching for driving the motor of FIGS. 2A-2B in accordance with some embodiments.

FIG. 6 is a flowchart of an example method 350 for automatic control switching for driving the motor 150 in accordance with some embodiments. In the example illustrated, the method 350 includes determining, using the motor controller 224, a first load point based on user inputs 232 (at block 354). The motor controller 224 receives user inputs 232, for example, a speed input from a trigger switch 128, a torque limit from a torque setting dial 120, a direction signal from a forward/reverse selector 124, an operation mode from a mode selector, and the like. The motor controller 224 determines the load point based on these user inputs 232. For example, the load point is one of a high speed low torque application, a high speed high torque application, a low speed low torque application, a low speed high torque application and the like. In some embodiments, the load point may be a speed setting, for example, a high speed, a medium speed, a low speed (e.g., indicated by an amount of trigger pull when compared to associated thresholds or from a speed selector dial), and the like, or a torque setting, for example, a high torque, a medium torque, a low torque, and the like (e.g., indicated by an amount of trigger pull when compared to associated thresholds or from the torque dial 120). The load point may also be determined based on the application or mode selected using a mode selector of the power tool 100. In some embodiments, the motor controller 224 may store a look-up table in a memory of the motor controller 224 or the power tool 100 that includes a mapping between a plurality of user inputs 232 and associated load points (e.g., low, medium, or high load points).

The method 350 also includes determining, using the motor controller 224, a first motor control technique corresponding to the first load point (at block 358). As discussed above, the motor controller 224 may store a look-up table in a memory of the motor controller 224 or the power tool 100. The look-up table includes a mapping between a plurality of load points and motor control techniques. The motor controller 224 selects the first motor control technique (for example, six-step control, sinusoidal commutation, field oriented control, or the like) that corresponds to the first load point.

The method 350 further includes driving the motor 150 based on the first motor control technique (at block 362). The motor drive 220 implements the selected motor control technique as further described above. For example, the motor controller 224 drives the motor 150 using six-step control, sinusoidal commutation, field oriented control, or the like.

The method 350 also includes determining, using the motor controller 224, a change from the first load point to a second load point (at block 366). The motor controller 224 continues to analyze user inputs (e.g., periodically during the course of a tool operation) to determine the desired or operating load point of the power tool 100. The motor controller 224 determines the change in load point from the first load point to a second load point based on the change in user inputs 232, for example, using similar techniques as described above with respect to block 358. The method 350 also includes determining, using the motor controller 224, a second motor control technique corresponding to the second load point (at block 370). As discussed above, the motor controller 224 may store a look-up table in a memory of the motor controller 224 or the power tool 100. The look-up table includes a mapping between a plurality of load points and motor control techniques. The motor controller 224 selects the second motor control technique (for example, six-step control, sinusoidal commutation, field oriented control, and the like) that corresponds to the second load point.

The method 350 further includes driving the motor 150 based on the second motor control technique (at block 374). The motor drive 220 implements the selected motor control technique as further described above. For example, the motor controller 224 drives the motor 150 using six-step control, sinusoidal commutation, field oriented control, or the like.

Figure 7:
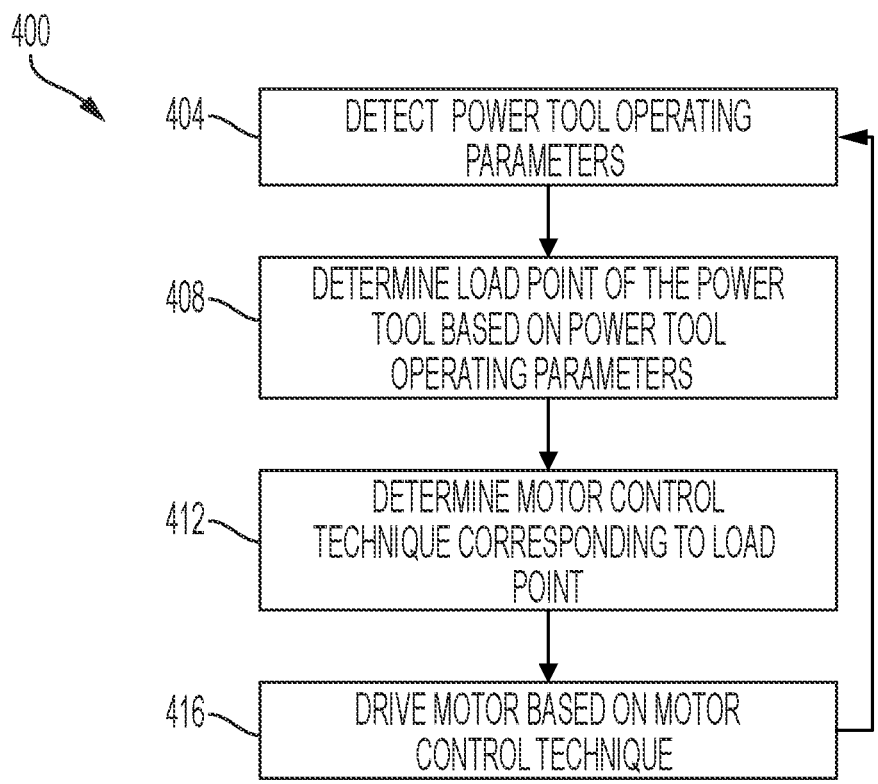
FIG. 7 is a flowchart of a method for automatic control switching for driving the motor of FIGS. 2A-2B in accordance with some embodiments.

FIG. 7 is a flowchart of an example method 400 for automatic control switching for driving the motor 150 in accordance with some embodiments. In the example illustrated, the method 400 includes detecting, using the motor controller 224, the power tool operating parameters (at block 404). The motor controller 224 is in communication with various sensors of the power tool 100 to determine the operating parameters of the power tool 100 or the motor 150. The motor controller 224 may use the sensors to determine motor current, motor voltage, torque output, and the like of the power tool 100.

The method 400 also includes determining, using the motor controller 224, a load point of the power tool 100 based on the power tool operating parameters (at block 408). For example, the load point is one of a high speed low torque application, a high speed high torque application, a low speed low torque application, a low speed high torque application and the like. In some embodiments, the load point may be a speed setting, for example, a high speed, a medium speed, a low speed, and the like or a torque setting, for example, a high torque, a medium torque, a low torque, and the like. The motor controller 224 determines the load point based on the sensor outputs monitored by the motor controller 224.

The method 400 further includes determining, using the motor controller 224, a motor control technique corresponding to the load point (at block 412). As discussed above, the motor controller 224 may store a look-up table in a memory of the motor controller 224 or the power tool 100. The look-up table includes a mapping between a plurality of load points and motor control techniques. The motor controller 224 selects the motor control technique (for example, six-step control, sinusoidal commutation, field oriented control, and the like) that corresponds to the load point. The method 350 includes driving the motor 150 based on the motor control technique (at block 416). The motor drive 220 implements the selected motor control technique as further described above. Similarly as discussed above with method 350, the method 400 may further include determining a change in the load point and automatically switching the motor control technique to one corresponding to the new load point.

One example implementation of the methods 350 and 400 may include seating and driving fasteners using the power tool 100. Seating a fastener may include precision control and low speed at the beginning of the fastening operation. The motor controller 224 detects the low speed and determines that the low speed corresponds to the first load point of the power tool 100. Typically, sinusoidal commutation or field oriented control is better suited for low speed applications as sinusoidal commutation and field oriented control provide better precision with low torque ripple output compared to the six-step control. The motor controller 224 therefore determines that, for example, field oriented control corresponds to the detected load point. The motor controller 224 drives the motor 150 based on field oriented control. Once the fastener is seated, the power tool 100 may operate at a high speed to drive the fastener into the workpiece. The motor controller 224 detects the change from low speed to high speed. Typically six-step control is better suited for high speed operation as six-step control provides longer run times before overheating and can achieve higher peak performance than sinusoidal or field oriented control. The motor controller 224 therefore determines that six-step control corresponds to high speed operation based on, for example, a pre-stored look-up table. In response, the motor controller 224 drives the motor 150 based on six-step control until the fastening operation is complete.

As discussed above, the motor 150 is a sensorless motor and does not include Hall-effect sensors or external angular position sensors (i.e., external to the motor components). One alternative to using external position sensors to detect rotor position and control the motor is high-frequency injection rotor position sensing. Typically, high-frequency injection rotor position sensing includes space vector modulation to inject higher order harmonic frequencies through inverter bridge modulation. The high-frequency signals are injected onto the PWM signals provided to the FETs 240, 244. The motor 150 response to these frequencies is used to determine the rotor position at start up and during operation. However, high-frequency injection through inverter modulation requires higher switching speeds, which increases inverter bridge 228 losses and decreases performance of the motor 150.

Figure 8:
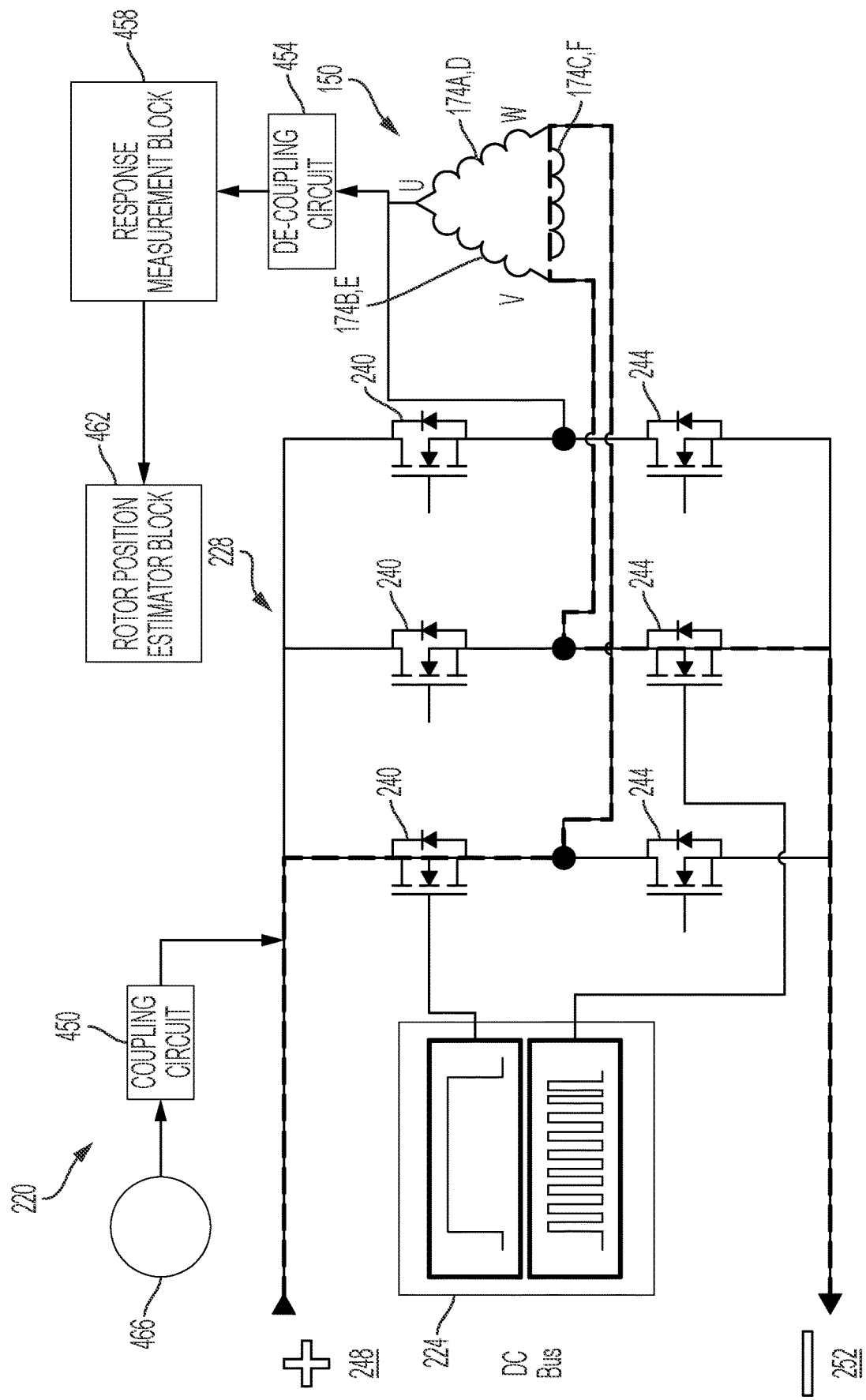
FIG. 8 is a simplified block diagram of the motor drive of FIG. 3 implementing high-frequency injection rotor position detection in accordance with some embodiments.

FIG. 8 illustrates the motor drive 220 for high-frequency injection rotor position detection in accordance with some embodiments. In some embodiments, high-frequency refers to a frequency greater than the nominal switching frequency of the inverter bridge 228. In some examples, the nominal switching frequency of the inverter bridge 228 is a frequency between about 8 kHz and 20 kHz. The motor drive 220 of FIG. 8 is similar to the motor drive 220 as illustrated in FIGS. 3-5, but with the logical components of the motor controller 224 for high-frequency injection broken-down and illustrated. The motor drive 220 includes a coupling circuit 450, a de-coupling circuit 454, a response measurement block 458, and a rotor position estimator block 462. For example, the motor controller 224 may implement one or more of the response measurement block 458 and the rotor position estimator block 462. The coupling circuit 450 receives a high-frequency injection signal from, for example, a signal generator 466, which may include an oscillator to generate the high-frequency injection signal. The coupling circuit 450 couples the injection signal onto the DC bus 248, 252. In the example illustrated, the coupling circuit 450 couples the injection signal on to the positive DC bus 248. In other examples, the coupling circuit 450 may couple the injection signal on to the negative DC bus 252 or both the positive DC bus 248 and the negative DC bus 252. In some embodiments, the coupling circuit 450 includes a capacitor that capacitively couples the signal generator 466 to the DC bus 248, 252. In some embodiments, the coupling circuit 450 includes a transformer (e.g., coil of wound wire) that couples the signal generator 466 to the DC bus 248, 252. The DC bus 248, 252 provides the injection signal along with the DC operation voltage signal to the inverter bridge 228 for operation of the motor 150.

The de-coupling circuit 454 is connected to the motor phase coils 174. The de-coupling circuit 454 is selectively connected to the inactive phase coil 174 (also referred to as non-driven phase) to extract the motor response to the high-frequency injection. The de-coupling circuit 454 de-couples the response signal from other signals detected on the inactive phase coil 174. The de-coupling circuit 454 provides the response signal to the response measurement block 458. The de-coupling circuit 454 may have a similar structure as the coupling circuit. For example, the de-coupling circuit 454 may capacitively couple the inactive phase coil 174 to the response measurement block 458, or may include a transformer to couple the inactive phase coil 174 to the response measurement block 458. For example, the response signal is a current signal that is the response of the motor 150 to the high-frequency injection signal. The de-coupling circuit 454 provides the response current signal as the response signal to the response measurement block 458. In the example illustrated, for simplifying the explanation, a single de-coupling circuit 454 is illustrated and the de-coupling circuit 454 is connected to a single motor terminal. However, the de-coupling circuit 454 may be connected to all motor terminals U, V, and W to detect the response of each motor terminal during the motor terminal's inactive phase. Alternatively, separate de-coupling circuits 454 may be provided, one for each of the motor terminals, to provide the response signal from each motor terminal to the response measurement block 458.

The response measurement block 458 receives the response signal from the de-coupling circuit 454 and measures the motor's response to the high-frequency injection signal. For example, the response measurement block 458 detects the impedance (for example, reluctance, inductance, and the like) of each motor coil 174 in response to the high-frequency injection. The response measurement block 458 provides the measured response to the rotor position estimator block 462 as a measurement signal. The characteristic of the measured signal could then be used to determine information about the motor and rotor position. For example, in some embodiments, the amplitude difference or phase difference (delay) between the injected and measured signals indicates the rotor position.

The rotor position estimator block 462 receives the measurement signal from the response measurement block 458 and determines the rotor position, rotor speed, or both based on the measurement signal. The motor controller 224 may store a look-up table including a mapping between different impedance measurements and rotor positions. The rotor position estimator block 462 determines the rotor position by referring the look-up table to determine the rotor position corresponding to the impedance measurement. The rotor position estimator block 462 may use the changing rotor position to also determine the rotation speed of the motor 150.

In some embodiments, the de-coupling circuit 454, the response measurement block 458, and/or the rotor position estimator block 462 are provided in the rotor position detector 268 (see FIGS. 4 and 5). The motor 150 is then driven by the motor drive 220 based on the rotor position and/or rotor speed provided by the rotor position detector 268 in accordance with any of the motor control techniques described above without the need of a separate rotor position sensor (for example, a Hall sensor, or external position sensor).

Figure 9:
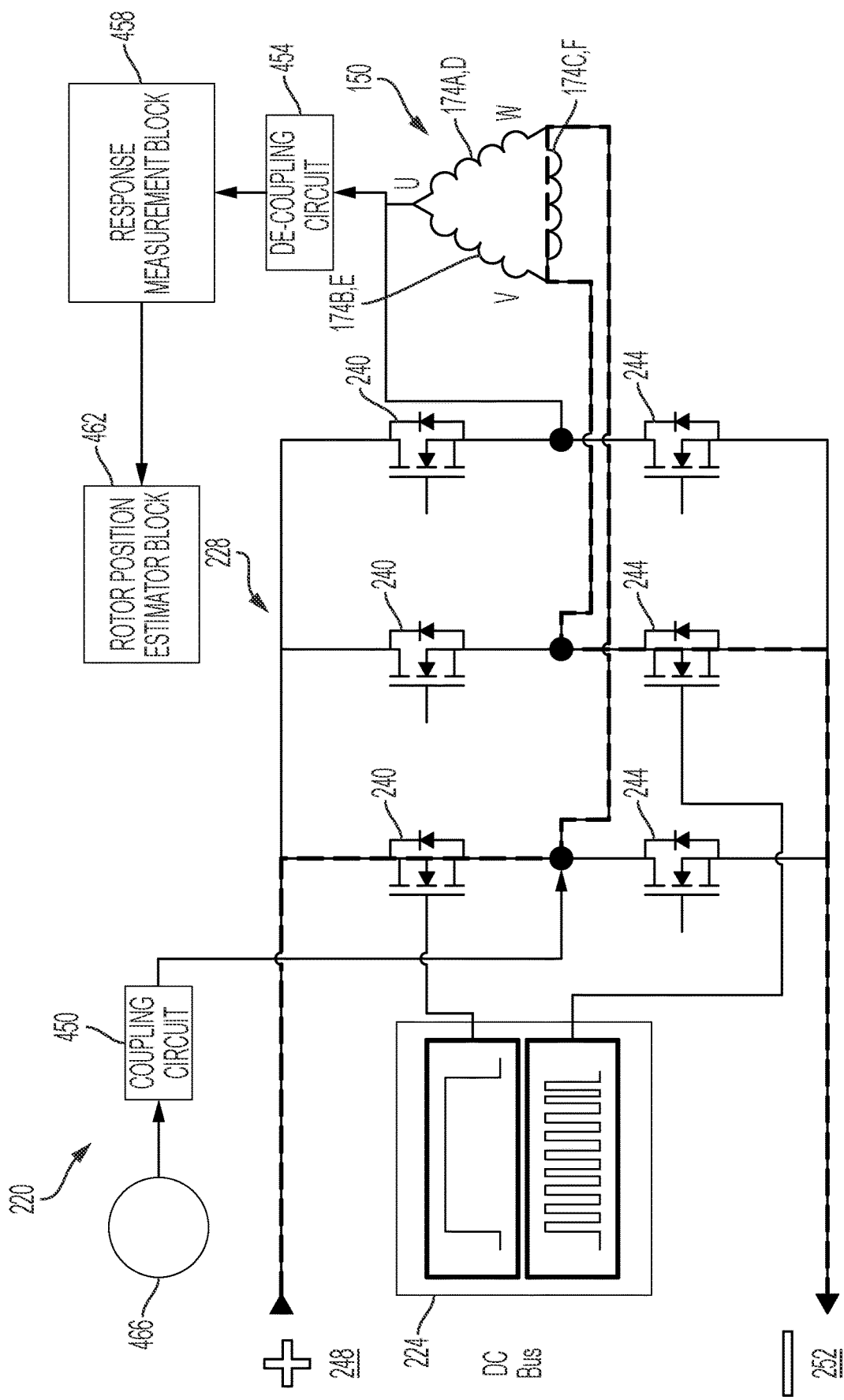
FIG. 9 is a simplified block diagram of the motor drive of FIG. 3 implementing high-frequency injection rotor position detection in accordance with some embodiments.

FIG. 9 illustrates the motor drive 220 for high-frequency injection rotor position detection in accordance with some embodiments. The motor drive 220 of FIG. 9 is similar to the motor drive 220 of FIG. 8. However, in the example illustrated in FIG. 9, the high-frequency injection signal is coupled directly at the motor terminals U, V, and W rather than the DC bus 248, 252. The coupling circuit 450 couples the high-frequency injection signal at the junction of the high-side FETs 240 and the low-side FETs 244. In some embodiments, the coupling circuit 450 couples the high-frequency injection signal directly on the terminals U, V, and W of the motor 150.

In the example illustrated in FIG. 9, a single coupling circuit 450 is illustrated and the coupling circuit 450 is connected to a single motor terminal. However, the coupling circuit 450 may be connected to all motor terminals U, V, and W to provide the high-frequency injection signal to each motor terminal. Alternatively, separate coupling circuits 450 may be provided, one for each of the motor terminals, to provide the injection signal from the signal generator 466 to each motor terminal. For example, the motor controller 224 may control the coupling circuit(s) 450 to inject the high-frequency signal to a motor terminal U, V, and W when the corresponding high-side FET 240 of the motor terminal is closed and the corresponding low-side FET 244 of the motor terminal is open.

In some embodiments, the motor controller 224 injects a third harmonic frequency signal into the DC bus 248, 252 or the motor terminals U, V, and W using space vector modulation. In this example, the third harmonic frequency refers to a frequency approximately three times the frequency of the output signal of the inverter bridge 228 (e.g., when the output signal of the inverter bridge 228 is 200 Hz, the injected signal is about 600 Hz). The rotor position detector 268 determines the motor response to the third harmonic injection to estimate the rotor position and speed. Third harmonic injection creates a sinusoidal BEMF response in the inactive phase terminals. Accordingly, third harmonic injection provides for a more accurate rotor position and rotor speed estimate.

Figure 10:
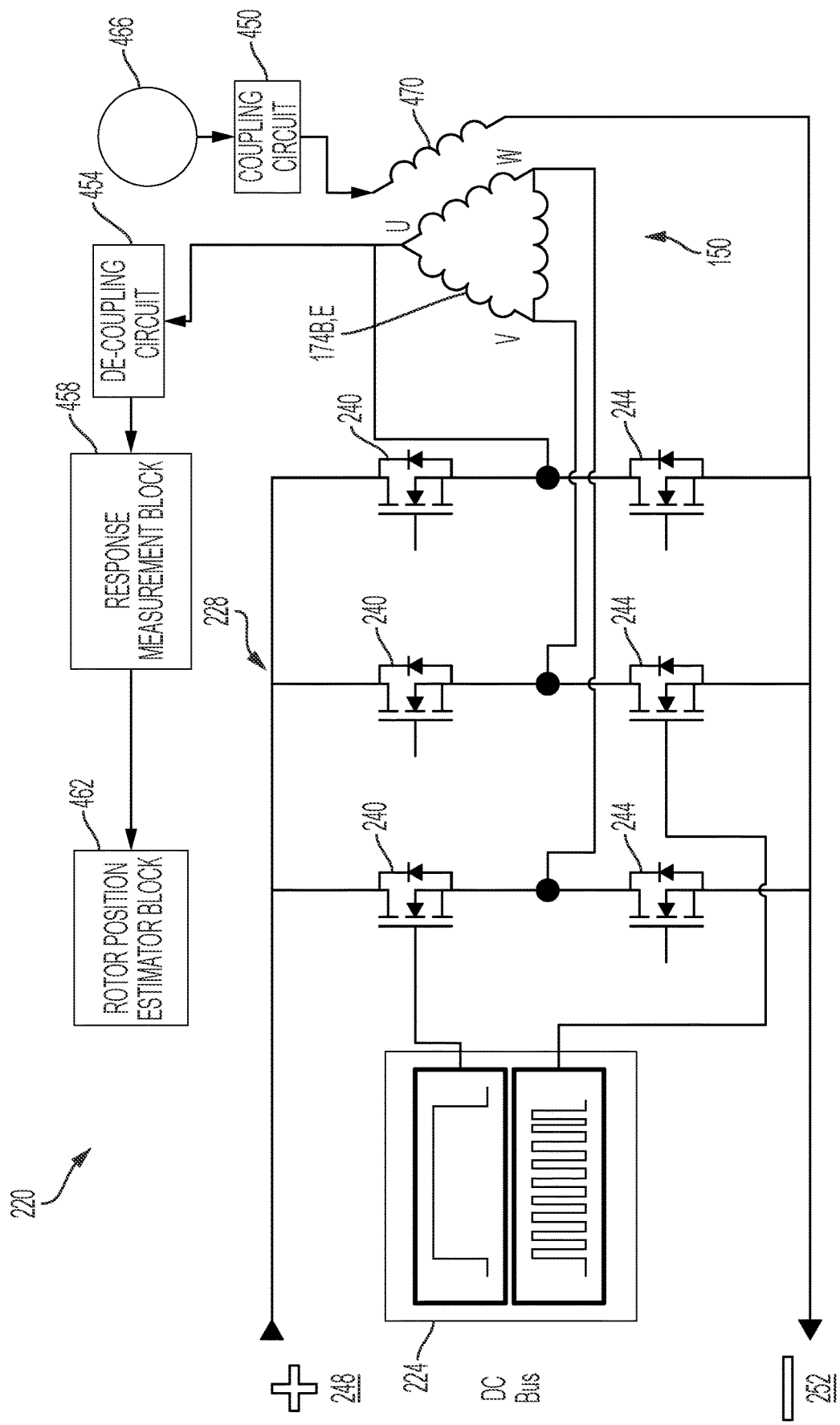
FIG. 10 is a simplified block diagram of the motor drive of FIG. 3 implementing high-frequency injection rotor position detection in accordance with some embodiments.
Figure 11:
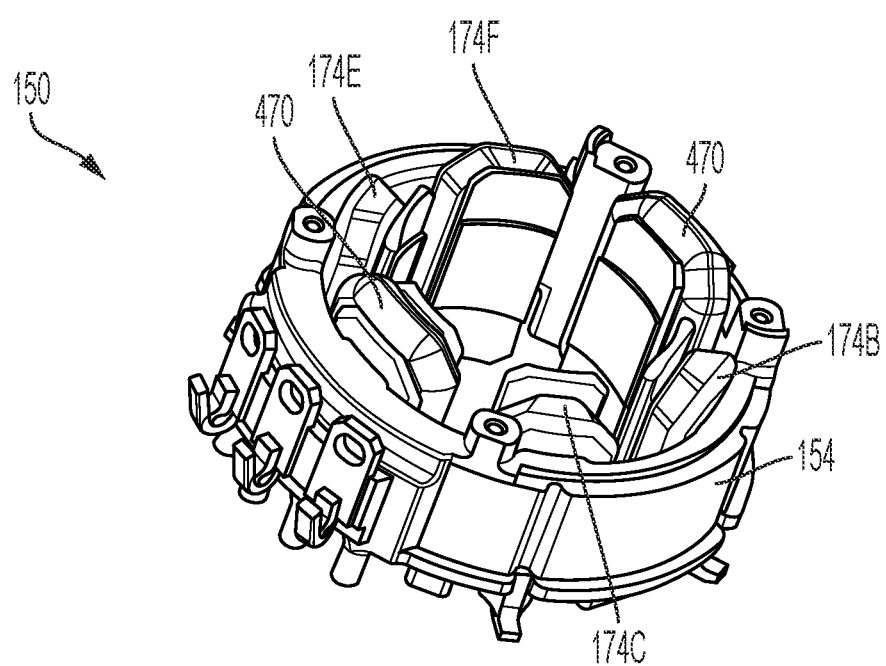
FIG. 11 is a perspective view of a motor of the power tool of FIG. 1 including an injection coil in accordance with some embodiments.

FIG. 10 illustrates the motor drive 220 for high-frequency injection rotor position detection in accordance with some embodiments. The motor drive 220 of FIG. 9 is similar to the motor drives 220 of FIGS. 8 and 9. However, in the example illustrated in FIG. 9, the high-frequency signal is injected into an injection coil 470. The injection coil 470 receives the high-frequency injection signal and is not used to power the motor 150. Particularly, the coupling circuit 450 provides the high-frequency injection signal from the signal generator 466 to the injection coil 470. In these embodiments, the response of the inactive coils 174 is similarly detected as described above with respect to FIGS. 8 and 9. The rotor position and/or speed are detected based on the motor's response to high-frequency injection into the injection coil 470. As discussed above, space vector modulation with third harmonic injection in the injection coil 470 may be used to detect the motor 150 response to increase the accuracy of rotor position estimation. In some embodiments, the injection coil 470 may be provided around an existing phase coil 174. FIG. 11 illustrates one example placement of the injection coil 470. In the example illustrated, the injection coil 470 is wound around an existing phase coil 174 of the motor 150. The injection coil 470 may be placed in other locations, for example, at a top or bottom of the stator 154.

Figure 12:
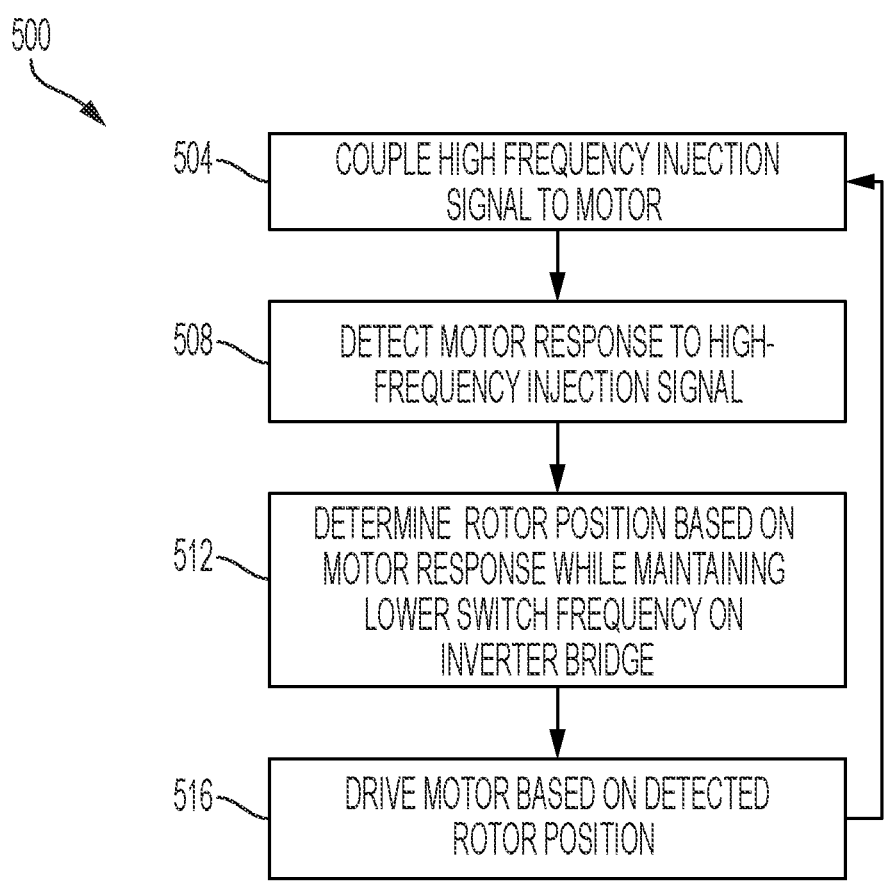
FIG. 12 is a flowchart of a method for high-frequency injection rotor position detection in the motor of FIGS. 2A-2B in accordance with some embodiments.

FIG. 12 is a flowchart of an example method 500 for high-frequency injection rotor position detection. In the example illustrated, the method 500 includes coupling, using the coupling circuit 450, the high-frequency injection signal to the motor 150 (at block 504). As discussed above, the coupling circuit 450 couples the high-frequency injection signal to one of the DC bus 248, 252, the motor terminals U, V, and W, and the injection coil 470. The high-frequency injection signal generally has a higher frequency than the switching frequency of the inverter bridge 228. Coupling the high-frequency injection signal onto the DC bus or the motor coils 174, 470 helps maintain lower switch frequency of the inverter bridge 228 and increase performance.

The method 500 also includes detecting, using the motor controller 224, motor response to the high-frequency injection signal (at block 508). The motor response is detected on the inactive phase coils 174 of the motor 150. The de-coupling circuit 454 detects the motor response and provide the response signal to the response measurement block 458. The response measurement block 458 measures the motor response based on the response signal, as discussed in further detail above, and provides the measurement signal to the rotor position estimator block 462.

The method 500 also includes determining, using the motor controller 224, rotor position based on the motor response, while maintaining lower switch frequency on the inverter bridge 228 (at block 512). The rotor position estimator block 462 receives the motor response and estimates the rotor position based on the motor response. Particularly, the rotor position estimator block 462 receives the measurement signal and estimates the rotor position based on the measurement signal as further described above. As discussed above, because the high-frequency injection signal is provided on the DC bus 248, 252 or the motor terminals, the normal switching frequency of the FETs 240, 244 of the inverter bridge 228 used for operating the motor 150 is not affected.

The method 500 includes driving the motor 150 based on the detected rotor position (at block 516). The rotor position and/or speed detected by the rotor position detector 268 is used to drive the motor 150. For example, in six-step control, the rotor position is used to activate the next coil 174 or block of the motor 150. In sinusoidal commutation, the rotor position is provided to the sinusoidal reference block 272 to determine the PWM control signals for the inverter bridge 228. In field oriented control, the rotor position is provided to a Park transform block of the Clarke and Park transform block 288 and the inverse Park transform block to determine the PWM control signals for the inverter bridge 228. The method 500 may then loop back to block 504.

Thus, various embodiments described herein provide for sensorless motors for power tools and control of sensorless motors. Various features and advantages are set forth in the following claims.

What is claimed is:

1. A power tool comprising;
a sensorless motor;
an inverter bridge configured to provide operating power to the sensorless motor; and
a motor controller coupled to the inverter bridge, the motor controller configured to
determine a first load point based on a user input, wherein the first load point is one selected from the group consisting of a high speed low torque application, a high speed high torque application, a low speed low torque application, and a low speed high torque application,
determine a first motor control technique corresponding to the first load point,
drive, using the inverter bridge, the sensorless motor based on the first motor control technique,
determine a change from the first load point to a second load point;
determine a second motor control technique corresponding to the second load point, and
drive, using the inverter bridge, the sensorless motor based on the second motor control technique.

2. The power tool of claim 1, wherein the first motor control technique is one selected from the group consisting of: block commutation, sinusoidal control, and field oriented control.

3. The power tool of claim 1, wherein the second motor control technique is one selected from the group consisting of: block commutation, sinusoidal control, and field oriented control.

4. The power tool of claim 1, wherein the user inputs include one or more selected from the group consisting of: speed input from a trigger switch, a torque limit from a torque setting dial, a direction signal from a forward/reverse selector, and an operation mode from a mode selector.

5. The power tool of claim 1, wherein the change from the first load point to the second load point is detected based on a change in the user input.

6. The power tool of claim 1, wherein the second load point is one selected from the group consisting of a high speed low torque application, a high speed high torque application, a low speed low torque application, and a low speed high torque application.

7. The power tool of claim 1, further comprising:
a coupling circuit; and
a decoupling circuit,
wherein the motor controller is further configured to
couple, using the coupling circuit, a high-frequency injection signal to the sensorless motor,
detect, using the decoupling circuit, motor response to the high-frequency injection signal,
determine rotor position based on motor response while maintaining a lower switch frequency on the inverter bridge, and
drive, using the inverter bridge, the sensorless motor based on detected rotor position.

8. A method for automatic control switching for driving a sensorless motor of a power tool, the method comprising:
detecting, using a motor controller, a power tool operating parameter;
determining, using the motor controller, a load point of the power tool based on the power tool operating parameter, wherein the load point is one selected from the group consisting of a high speed low torque application, a high speed high torque application, a low speed low torque application, and a low speed high torque application;
determining, using the motor controller, a motor control technique corresponding to the load point; and
driving, using the motor controller, the sensorless motor based on the motor control technique.

9. The method of claim 8, wherein the motor control technique is one selected from the group consisting of: block commutation, sinusoidal control, and field oriented control.

10. The method of claim 8, wherein the power tool operating parameter is detected using one or more sensors.

11. The method of claim 10, wherein the one or more sensors are used to detect one or more selected from the group consisting of: a motor current, a motor voltage, and a torque output.

12. The method of claim 8, further comprising:
coupling, using a coupling circuit, a high-frequency injection signal to the sensorless motor,
detecting, using a decoupling circuit, motor response to the high-frequency injection signal,
determining, using the motor controller coupled to the decoupling circuit, rotor position based on motor response while maintaining a lower switch frequency on an inverter bridge, and
driving, using the motor controller and the inverter bridge, the sensorless motor based on detected rotor position.

13. A power tool comprising;
a sensorless motor;
an inverter bridge configured to provide operating power to the sensorless motor; and
a motor controller coupled to the inverter bridge, the motor controller configured to
detect a power tool operating parameter;
determine a load point of the power tool based on the power tool operating parameter, wherein the load point is one selected from the group consisting of a high speed low torque application, a high speed high torque application, a low speed low torque application, and a low speed high torque application;
determine a motor control technique corresponding to the load point; and
drive, using the inverter bridge, the sensorless motor based on the motor control technique.

14. The power tool of claim 13, wherein the motor control technique is one selected from the group consisting of: block commutation, sinusoidal control, and field oriented control.

15. The power tool of claim 13, further comprising one or more sensors, wherein the power tool operating parameter is detected using the one or more sensors.

16. The power tool of claim 15, wherein the one or more sensors are used to detect one or more selected from a group consisting of: a motor current, a motor voltage, and a torque output.

17. The power tool of claim 13, further comprising:
a coupling circuit; and
a decoupling circuit,
wherein the motor controller is further configured to
couple, using the coupling circuit, high-frequency injection signal to the sensorless motor,
detect, using the decoupling circuit, motor response to the high-frequency injection signal,
determine rotor position based on motor response while maintaining a lower switch frequency on the inverter bridge, and
drive, using the inverter bridge, the sensorless motor based on detected rotor position.

18. A power tool comprising;
a sensorless motor;
an inverter bridge configured to provide operating power to the sensorless motor; and
a motor controller coupled to the inverter bridge, the motor controller configured to:
determine a first load point based on a user input,
determine a first motor control technique corresponding to the first load point,
drive, using the inverter bridge, the sensorless motor based on the first motor control technique,
determine a change from the first load point to a second load point;
determine a second motor control technique corresponding to the second load point, wherein the second load point is one selected from the group consisting of a high speed low torque application, a high speed high torque application, a low speed low torque application, and a low speed high torque application, and
drive, using the inverter bridge, the sensorless motor based on the second motor control technique.

19. A power tool comprising;
a sensorless motor;
an inverter bridge configured to provide operating power to the sensorless motor;
a coupling circuit;
a decoupling circuit; and
a motor controller coupled to the inverter bridge, the motor controller configured to:
determine a first load point based on a user input,
determine a first motor control technique corresponding to the first load point,
drive, using the inverter bridge, the sensorless motor based on the first motor control technique, determine a change from the first load point to a second load point;

determine a second motor control technique corresponding to the second load point, drive, using the inverter bridge, the sensorless motor based on the second motor control technique, couple, using the coupling circuit, a high-frequency injection signal to the sensorless motor, detect, using the decoupling circuit, motor response to the high-frequency injection signal, determine rotor position based on motor response while maintaining a lower switch frequency on the inverter bridge, and drive, using the inverter bridge, the sensorless motor based on detected rotor position.

20. A method for automatic control switching for driving a sensorless motor of a power tool, the method comprising:

detecting, using a motor controller, a power tool operating parameter;

determining, using the motor controller, a load point of the power tool based on the power tool operating parameter;

determining, using the motor controller, a motor control technique corresponding to the load point;

driving, using the motor controller, the sensorless motor based on the motor control technique, coupling, using a coupling circuit, a high-frequency injection signal to the sensorless motor, detecting, using a decoupling circuit, motor response to the high-frequency injection signal, determining, using the motor controller coupled to the decoupling circuit, rotor position based on motor response while maintaining a lower switch frequency on an inverter bridge, and driving, using the motor controller and the inverter bridge, the sensorless motor based on detected rotor position.

21. A power tool comprising;

a sensorless motor;

an inverter bridge configured to provide operating power to the sensorless motor;

a coupling circuit;

a decoupling circuit; and a motor controller coupled to the inverter bridge, the motor controller configured to:

detect a power tool operating parameter, determine a load point of the power tool based on the power tool operating parameter, determine a motor control technique corresponding to the load point, drive, using the inverter bridge, the sensorless motor based on the motor control technique, couple, using the coupling circuit, high-frequency injection signal to the sensorless motor, detect, using the decoupling circuit, motor response to the high-frequency injection signal, determine rotor position based on motor response while maintaining a lower switch frequency on the inverter bridge, and drive, using the inverter bridge, the sensorless motor based on detected rotor position.

* * * * *